US010169217B2

(12) United States Patent
Yu et al.

(10) Patent No.: US 10,169,217 B2
(45) Date of Patent: Jan. 1, 2019

(54) SYSTEM AND METHOD FOR TEST GENERATION FROM SOFTWARE SPECIFICATION MODELS THAT CONTAIN NONLINEAR ARITHMETIC CONSTRAINTS OVER REAL NUMBER RANGES

(71) Applicant: General Electric Company, Schenectady, NY (US)

(72) Inventors: Han Yu, Clifton Park, NY (US); Michael Richard Durling, Gansevoort, NY (US); Kit Yan Siu, Saratoga Spring, NY (US); Meng Li, Schenectady, NY (US); Baoluo Meng, Iowa City, IA (US); Scott Alan Stacey, Dayton, OH (US); Daniel Edward Russell, Walker, MI (US); Gregory Reed Sykes, Caledonia, MI (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 122 days.

(21) Appl. No.: 15/092,453

(22) Filed: Apr. 6, 2016

(65) Prior Publication Data

US 2017/0293549 A1    Oct. 12, 2017

(51) Int. Cl.
*G06F 11/36*    (2006.01)
(52) U.S. Cl.
CPC ...... *G06F 11/3684* (2013.01); *G06F 11/3604* (2013.01); *G06F 11/3692* (2013.01)
(58) Field of Classification Search
None
See application file for complete search history.

(56) References Cited

U.S. PATENT DOCUMENTS 7,401,305 B2    7/2008  Shacham et al.
7,644,334 B2    1/2010  Hickman et al.
(Continued)

OTHER PUBLICATIONS

Cordeiro et al. "SMT-based bounded model checking for embedded ANSI-C software." IEEE Transactions on Software Engineering 38.4 (2012): 957-974. Retrieved on [Aug. 18, 2018] Retrieved from the Internet: URL<https://ieeexplore.ieee.org/abstract/document/5928354/>.*

(Continued)

*Primary Examiner* — Thuy Dao
*Assistant Examiner* — Cheneca Smith
(74) *Attorney, Agent, or Firm* — GE Global Patent Operation; Nitin Joshi

(57) ABSTRACT

A computer-implemented system for generating test cases and/or test procedures to verify software having a nonlinear arithmetic constraint over a Real number range. The system includes a translator that receives, as input, software specification models for the software to be verified. The translator is configured to generate, as output, a plurality of SMT formulas that are semantically equivalent to the software specification models. The system includes an analytical engine pool that receives, as input, the plurality of SMT formulas from the translator and analyzes the plurality of SMT formulas, and generates, as output, test case data for each of the plurality of SMT formulas determined to be satisfiable. The system includes a post-processor that receives, as input, the test case data from the analytical engine pool and generates, as output, the test cases and/or test procedures for the software to be verified based on the test case data.

20 Claims, 4 Drawing Sheets

(56) References Cited

U.S. PATENT DOCUMENTS

| | | | |
|---|---|---|---|
| 7,685,547 B1 | 3/2010 | Gupta et al. | |
| 7,861,226 B1 | 12/2010 | Episkopos et al. | |
| 7,865,339 B2 | 1/2011 | Rushby et al. | |
| 8,381,145 B2* | 2/2013 | Park | G06F 11/3608 716/101 |
| 8,527,922 B1 | 9/2013 | Baumgartner et al. | |
| 8,539,451 B2* | 9/2013 | Ivancic | G06F 11/3608 714/38.1 |
| 8,639,643 B2* | 1/2014 | Wu | G06F 17/30707 706/13 |
| 8,726,241 B1* | 5/2014 | Limondin | G06F 9/44 717/126 |
| 8,812,276 B2 | 8/2014 | Aldrich et al. | |
| 8,869,113 B2* | 10/2014 | Li | G06F 11/3684 717/118 |
| 8,935,654 B2 | 1/2015 | Sengupta et al. | |
| 8,965,944 B2 | 2/2015 | Ziv | |
| 8,996,339 B2 | 3/2015 | Chockler et al. | |
| 2004/0019468 A1 | 1/2004 | De Moura et al. | |
| 2007/0250799 A1 | 10/2007 | Bunin et al. | |
| 2008/0082968 A1 | 4/2008 | Chang et al. | |
| 2010/0293530 A1* | 11/2010 | Ivancic | G06F 11/3608 717/126 |
| 2011/0083121 A1 | 4/2011 | Dixit et al. | |
| 2011/0173148 A1* | 7/2011 | Ganai | G06N 5/003 706/46 |
| 2011/0246954 A1* | 10/2011 | Park | G06F 11/3608 716/102 |
| 2011/0283147 A1* | 11/2011 | Prasad | G06F 11/3608 714/38.1 |
| 2012/0017119 A1* | 1/2012 | Ghosh | G06F 11/3684 714/38.1 |
| 2012/0192150 A1* | 7/2012 | Li | G06F 11/3684 717/118 |
| 2013/0055221 A1* | 2/2013 | Murthy | G06F 11/3608 717/132 |
| 2015/0293831 A1* | 10/2015 | Li | G06F 11/36 717/124 |
| 2015/0339217 A1* | 11/2015 | Avgerinos | G06F 11/3608 717/132 |
| 2016/0078559 A1* | 3/2016 | Ventura | G06Q 40/02 705/30 |

OTHER PUBLICATIONS

Nuzzo, Pierluigi, et al. "CalCS: SMT solving for non-linear convex constraints." Formal Methods in Computer-Aided Design (FMCAD), 2010. IEEE, 2010. Retrieved on [Aug. 18, 2018] Retrieved from the Internet: URL<https://ieeexplore.ieee.org/abstract/document/5770935/>.*

Peleska et al., "Symbolic Test Case Generation for Time-Discrete Hybrid Systems", pp. 5 of 10, http://www.informatik.uni-bremen.de/agbs/projects/hybris/rtas2006_fraenzle_peleska_teige.pdf.

Xia et al., "Toward Automated Test Generation for Engineering Applications", 20th IEEE/ACM International Conference on Automated Software Engineering, 2008, pp. 1-6.

Beyer et al., "Generating Tests from Counterexamples", 2004, pp. 1-10https://ranjitjhala.github.io/staticgenerating_tests_from_counterexamples.pdf.

Anand, Saswat, "An Orchestrated Survey on Automated Software Test Case Generation", Preprint submitted to Journal of Systems and Software, Feb. 11, 2013, pp. 1-28.

Gao, Sicun et al., "dReal: An SMT Solver for Nonlinear Theories over the Reals" 2016, pp. 1-6, http://dreal.cs.cmu.edu.

Caspi, P. et al., LUSTRE: A declarative language for programming synchronous systems Received Oct. 15, 1986, pp. 1-11, BP68, 38402 St Martin d'HBres, France.

* cited by examiner

```
(set-logic QF_NRA)
(set-info :precision 0.000)
(declare-fun var_1 () Real)
(declare-fun var_2 () Real)
(declare-fun var_3 () Real)
(declare-fun FMS_REQ_FN_SYS_1 () Bool)
(assert FMS_REQ_FN_SYS_1)
(assert (and (>= var_1 0) (<= var_1 2)))
(assert (and (>= var_2 0) (<= var_2 2)))
(assert (and (>= var_3 0) (<= var_3 2)))
(assert (= FMS_REQ_FN_SYS_1 (and (>= var_1 3.0) (= var_2 (sin var_3)))))
(assert (= var_1 3.0009765625))
(assert (= var_3 0.0015339807878885641))
(check-sat)
(exit)
```
— 62 var_1 = [3.0009765625, 3.0009765625]
var_2 = [0.0015339801862284763, 0.0015339801862284768]
var_3 = [0.0015339807878885641, 0.0015339807878885641]
Error Bound = 0.00100000000000000

— 58

| INPUT VARIABLE | VALUE |
|---|---|
| var_1 | 3.0009765625 |
| var_3 | 0.001533981 |

| OUTPUT VARIABLE | EXPECTED VALUE |
|---|---|
| var_2 | 0.001 |

| PRECISION | |
|---|---|
| | 0.001 |

SYSTEM AND METHOD FOR TEST GENERATION FROM SOFTWARE SPECIFICATION MODELS THAT CONTAIN NONLINEAR ARITHMETIC CONSTRAINTS OVER REAL NUMBER RANGES

BACKGROUND

The subject matter disclosed herein relates to software verification and, more specifically, to the automated generation of test cases and/or test procedures used during software verification.

Software verification is an important phase in the software development life cycle. Software verification generally involves the application of test cases, which may be in the form of a textual description of the test objectives, and test procedures, which typically contain test steps and test data and may be in the form of executable test scripts, depending on the software programming language and the specific testing platform. In certain fields, such as aviation control systems, extensive formal verification of control software may be required before the software can be deployed for use. Test case and/or test procedure generation, in particular, is an important aspect of software testing that is often a labor-intensive and time-consuming task. For example, more than 50% of total software development costs are often spent generating test case data and test steps manually from software requirements. As such, automated test case and test procedure generation can be beneficial to the software verification process.

Test case data is typically generated based on various software artifacts. For example, test case data may be generated using the software program structure and/or source code, information about the input/output data space, and/or information dynamically obtained from program execution. In particular, for model-based testing, test case data can be generated using the software specification and/or design models.

Model-based software verification generally uses software models to describe the possible input/output sequences on a chosen level of abstraction, and is linked to the low-level design implementation by a conformance relation. A test generation algorithm may be used to derive test case data from the software model by selecting a finite subset from the potentially infinite set of sequences specified by the model, and testing criterion may be applied to justify the adequateness of the selection. The test generation algorithm could use a combination of constraint solving, theorem proofing, and symbolic execution technologies to enable automatic test generation. The testing criterion can be based on numerous criteria, including requirements coverage and structure coverage like model coverage.

Automatic test case generation is possible for certain types of software. For example, test case data can be generated for software that includes only Boolean logic expressions, linear operations, and/or polynomial functions, since these expressions and functions can be easily solved through mathematical programming, constraint solving, and model checking. However, other software may include one or more nonlinear arithmetic functions that extend over Real number ranges (e.g., trigonometric functions, logarithm functions, exponential functions), and these functions are intrinsically hard and remain unsolved. As such, there remains a need for automatic test case generation for software that includes nonlinear arithmetic functions over Real number ranges.

BRIEF DESCRIPTION

In an embodiment, a computer-implemented system for generating test cases and/or test procedures to verify software having a nonlinear arithmetic constraint over a Real number range. The system includes a translator that receives, as input, software specification models for the software to be verified. The translator is configured to generate, as output, a plurality of SMT formulas that are semantically equivalent to the software specification models. The system includes an analytical engine pool that receives, as input, the plurality of SMT formulas from the translator and analyzes the plurality of SMT formulas, and generates, as output, test case data for each of the plurality of SMT formulas determined to be satisfiable. The system includes a post-processor that receives, as input, the test case data from the analytical engine pool and generates, as output, the test cases and/or test procedures for the software to be verified.

In another embodiment, a method of generating test cases and/or test procedures for software verification includes receiving, at processing circuitry of a software test generation system, software specification models for the software to be verified, wherein the software specification models include at least one nonlinear arithmetic constraint over a Real number range. The method includes generating, via the processing circuitry, SMT formulas that are semantically equivalent to the software specification models. The method also includes analyzing, via the processing circuitry, the SMT formulas using at least one SMT solver of an analytical engine pool to generate test case data for each of the SMT formulas that are satisfiable. The method further includes post-processing, via the processing circuitry, the test cases and/or test procedures for the software to be verified.

In another embodiment, a non-transitory, computer-readable medium stores instructions executable by processing circuitry of an electronic device to generate a test case for software verification. The instructions include instructions to receive a software specification model for the software to be verified, wherein the software specification model includes at least one nonlinear arithmetic constraint over a Real number range. The instructions include instructions to generate at least one SMT formula that is semantically equivalent to the software specification model. The instructions also include instructions to analyze the at least one SMT formula using a SMT solver and to generate test case data when the at least one SMT formula is satisfiable. The instructions further include instructions to generate, from the test case data, the test case for the software to be verified.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 3 and 4 illustrate portions of an example of generating a test case for a particular piece of software, in accordance with embodiments of the present approach.

DETAILED DESCRIPTION

Figure 1:
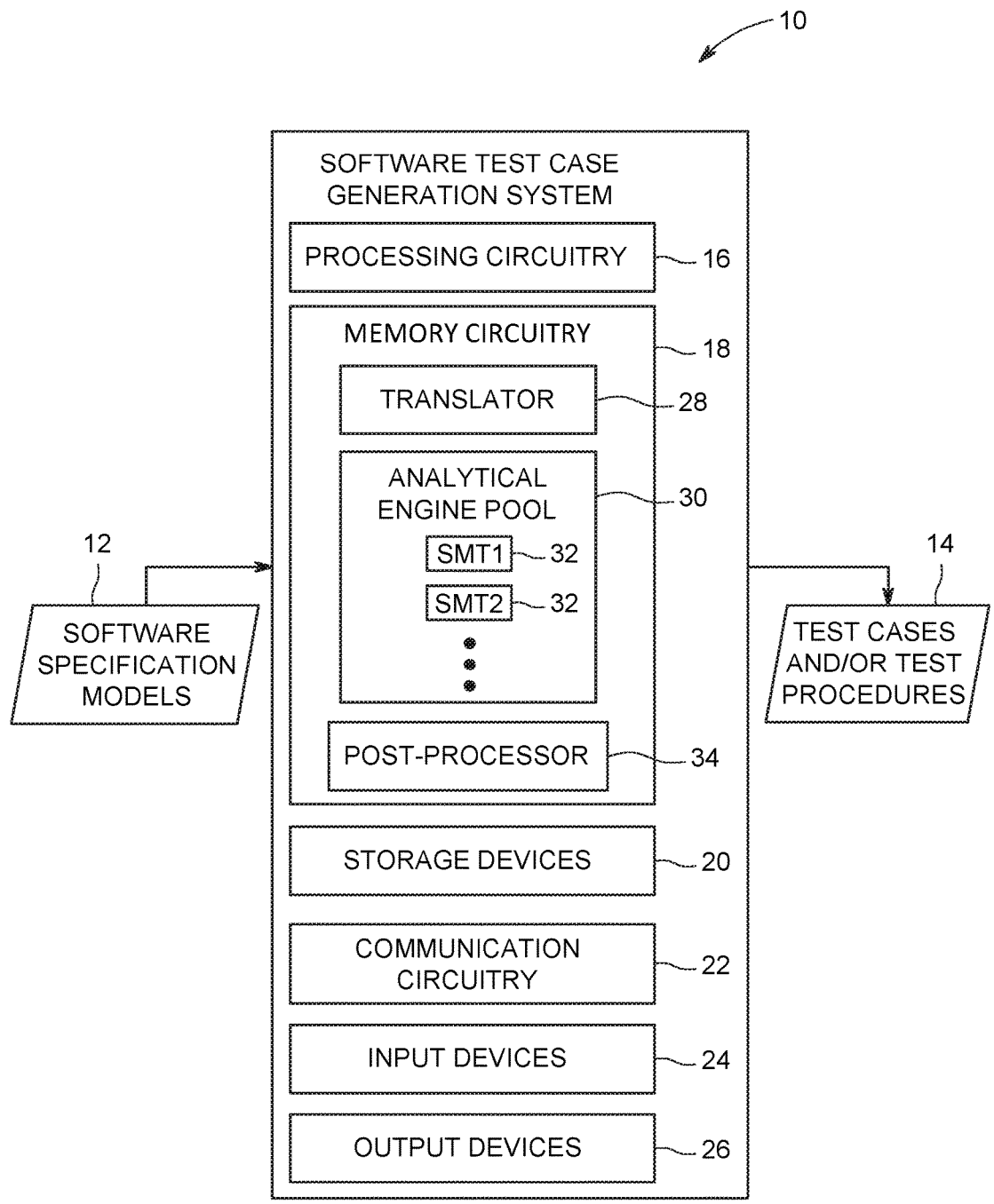
FIG. 1 is a schematic of a software test generation system capable of generating test cases and/or test procedures to formally verify the operation of software that contains nonlinear arithmetic constraints over Real number ranges, in accordance with embodiments of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, "software" refers to a collection of instructions (e.g., a module, a function, a procedure, an application, a program, or another suitable set of instructions) that, when executed by suitable processing circuitry, are capable of causing the processing circuitry to perform particular operations. It may be appreciated that software, as discussed herein, may include a number of associated software artifacts, such as executable code, pseudo-code, models, human-readable programming language, or supporting documentation, or a combination thereof.

Present embodiments are directed toward a system and a method for automated test generation (e.g., test cases and/or test procedures generation) from the software specification models of software that contains nonlinear arithmetic constraints over Real number ranges. It may be appreciated that many types of software may include such constraints, including modeling software and/or control system software that are respectively used to model and control various types systems (e.g., aviation systems, automotive systems, utility systems, turbine systems). As mentioned above, the software specification models are used to model the possible input/output sequences of high-level software requirements. The disclosed system is designed to receive, as inputs, software specification models in a software modeling language (e.g., Simulink, Unified Modeling Language (UML), Temporal Logic), and to translate the input software specification models into semantically equivalent satisfiability modulo theories (SMT) formulas. These SMT formulas are received, as inputs, by one or more analytic engines (e.g., SMT solvers) of the disclosed system to generate test case data. In certain embodiments, the disclosed system may apply one or more heuristics to satisfy one or more test objectives during the test case data generation. Additionally, in certain embodiments, the test data can be further formatted during post-processing into a predefined test case and/or test procedure format.

With the foregoing in mind, FIG. 1 illustrates an embodiment of a software test generation system 10, in accordance with embodiments of the present approach, designed to generate test cases and/or test procedures to formally verify the operation of software that contains nonlinear arithmetic constraints over Real number ranges. As illustrated in FIG. 1, the software test generation system 10 generally receives, as input, one or more software specification models 12 for the software to be verified, and generates, as output, one or more test cases and/or test procedures 14 to be used in the verification of the software. As discussed in greater detail below, the test cases and/or test procedures 14 generally include input variable values that will be provided to, and output variable values expected to be returned by, the software when executed during verification. As such, the presently disclosed software test generation system 10 enables the generation of test cases and/or test procedures 14 for the evaluation and testing of software having nonlinear arithmetic constraints over Real number ranges.

The illustrated embodiment of the software test generation system 10 illustrated in FIG. 1 includes processing circuitry 16 (e.g., one or more microprocessors) capable of executing instructions stored in memory circuitry 18 (e.g., random access memory (RAM), read-only memory (ROM)) to control the operation of the system 10, as discussed below. The system 10 illustrated in FIG. 1 further includes storage devices 20 (e.g., hard drives, solid-state drives (SSDs), flash memory drives), communication circuitry 22 (e.g., network cards, modems), input devices 24 (e.g., keyboard, mouse, touch screen), and output devices 26 (e.g., displays, printers, speakers). In other embodiments, other components may be present, in accordance with the present disclosure.

As mentioned, the memory circuitry 18 generally stores instructions that encode one or more functional components of the software test generation system 10. For the illustrated embodiment of FIG. 1, the memory circuitry 18 stores instructions for three components of the software test generation system 10. In particular, the illustrated memory circuitry 18 stores a translator 28, an analytical engine pool 30 that includes one or more SMT solvers 32, and a post-processor 34. As discussed in greater detail below, for the illustrated embodiment, the translator 28 generally functions to convert the software specification models 12 into SMT formulas, which are then analyzed by the SMT solvers 32 of the analytical engine pool 30 to generate test case data, which is then modified and augmented by the post-processor 34 to generate the test cases 14. As such, the translator 28, analytical engine pool 30, and post-processor 34 may, in certain embodiments, be implemented as separate modules, programs, or applications that cooperate to provide the functionality described herein. In other embodiments, the software test generation system 10 may include a translator 28, an analytical engine pool 30, and a post-processor 34 that are each executed by separate processing circuitry 16 of the same computer, or by the processing circuitry of a plurality of networked computers or virtual computing nodes.

In certain embodiments, the software test generation system 10 may be implemented using one or more general purpose computers. It may be appreciated that the illustrated the software test generation system 10 includes structural components (e.g., electronic components and circuitry) and software components (e.g., translator 28, analytical engine pool 30, and post-processor 34) that, in combination, yield the novel system 10 that provides the unique functionality described herein. As such, while portions of the system 10 may be constructed using general purpose components, the structural and functional relationship between the disclosed electronic components and software components of the software test generation system 10 yields a particular or specialized machine (e.g., a computerized system) designed for generating test cases and/or test procedures 14 from software specification models 12 that include nonlinear arithmetic constraints over Real numbers. Accordingly, present embodiments generally enable improvement in the functioning of software and computing systems by enhancing software testing via automatic generation of test cases 14.

Figure 2:
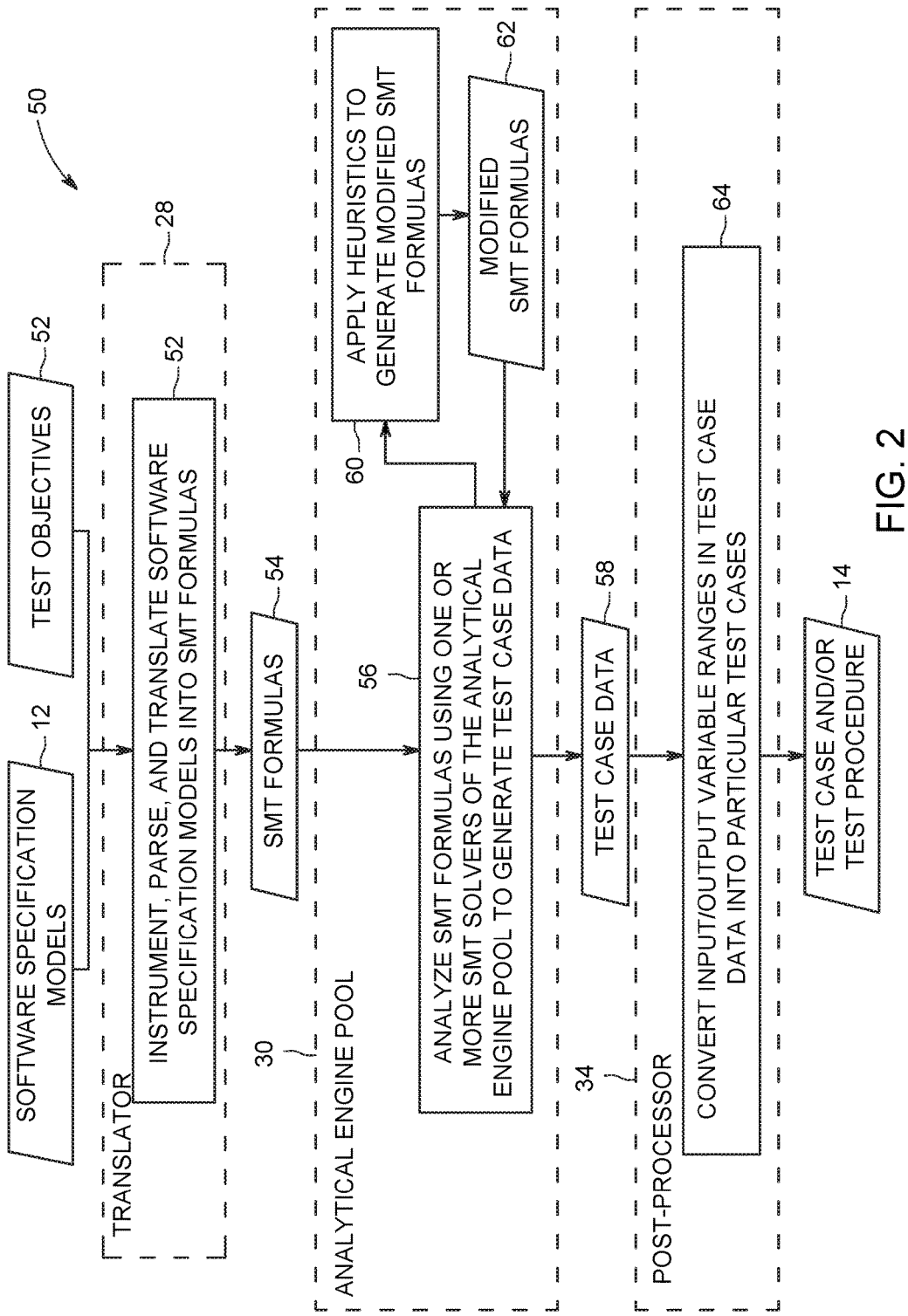
FIG. 2 is a flow diagram of a process whereby the software test generation system generates test cases from software specification models that include at least one nonlinear arithmetic constraint over a Real number range, in accordance with embodiments of the present approach.

FIG. 2 is a flow diagram illustrating an embodiment of a process 50 whereby the software test generation system 10 may generate one or more test cases and/or test procedures 14 from one or more software specification models 12 that include at least one nonlinear arithmetic constraint over a Real number range. In other embodiments, certain additional steps may be performed, certain steps may be performed in different orders, and certain steps may be omitted without negating the effect of the present approach.

The process 50 illustrated in FIG. 2 begins with the translator 28 receiving, as input, one or more software specification models 12 for the software to be verified. As illustrated in FIG. 2, one or more test objectives 50 (e.g., a precision value) may also be provided as input to the translator 28. The translator 28 subsequently instruments, parses, and translates (block 52) the software specification models 12 into semantically equivalent SMT formulas 54. For example, in certain embodiments, the translator 28 may receive the software specification models 12 in a software modeling language (e.g., Simulink, UML, Temporal Logic) or a structured modeling language (e.g., XML). The translator 28 may then instrument the software specification models 12 using the test objectives 52 to define, for example, the desired precision for the software verification process. Further, the translator 28 may parse the software specification models 12 to extract the software architecture information (e.g., the layout, the data flow, and the block information in Simulink), and then translate these into semantically equivalent SMT formulas 54.

It should be noted that the SMT formulas 54 are semantically equivalent to the software specification models 12. That is, while software specification models 12 and the SMT formulas 54 generally represent the same mathematical operations, limitations that are imposed on SMT formulas 54 prevent the direct translation of certain software features. By specific example, SMT formulas 54 do not include constraints based on a previous state or condition of a variable. As such, for any such state-based constraint present in the software specification model 12, the translator 28 may "flatten" the software specification model 12 to remove any state-based constraint to yield semantically equivalent stateless SMT formulas 54. Further, in certain embodiments, the translator 28 may translate the software specification models 12 into SMT formulas 54 via translation through an intermediate language. For example, in certain embodiments, the translator 28 may first convert the software specification models 12 into a strongly-typed programming language having complex data structures, such as Lustre or Lisp, which may then be subsequently converted to the SMT formulas 54.

Continuing through the process 50 illustrated in FIG. 2, the SMT formulas 54 are provided, as input, to the analytical engine pool 30. As mentioned, the analytical engine pool 30 may include one or more SMT solvers 32 capable of analyzing the SMT formulas 54. The analytical engine pool 30 analyzes (block 56) the SMT formulas 54 using the one or more SMT solvers 32 to generate test case data 58. For example, in certain embodiments, the SMT solvers 32 may include one or more open-source SMT solvers 32 such as dReal (available from https://dreal.github.io), CVC4 (available from http://cvc4.cs.nvu.edu/web/), or Z3 (available from https://github.com/Z3Prover/z3). It may be appreciated that certain SMT solvers 32 may be better (e.g., faster, more efficient) at analyzing SMT formulas 54 having certain types of constraints. As such, the analytical engine pool 30 may analyze a SMT formula, and may select the most efficient SMT solver 32 based on the operations performed therein.

In particular, dReal is an open-source SMT solver 32 for nonlinear formulas over Real numbers. It provides a delta-complete decision procedure framework to relax the standard decision problem for SMT formulas 54 over Real number ranges. Under the delta-complete decision framework, the input SMT formulas 54 are weakened and solved through a new procedure according to an error bound specified by the user, which corresponds to the desired precision to be used during later software testing. Thus, the SMT solver 32 provides an unsat output to the weakened formula to indicate that the original formula is not satisfiable, and provides test case data 58 as output if the weakened formula is satisfiable given the defined error bound. For example, an original formula is: $\sin(x)-1=0$. Instead of solving the original formula, the SMT solver 32 may instead solve a weakened form of the formula: $|\sin(x)-1|\leq 0.001$, which leads to a solution with a small error bound. As a result of this, as well as the inability to perfectly represent Real numbers having infinite digits, test case data 58 generated by the SMT solvers 32 of the analytical engine pool 30 include ranges of values for each input variable for which that the expected output will satisfy the SMT formulas 54 within the predefined error bound.

Additionally, as illustrated in FIG. 2, in certain embodiments, the analytical engine pool 30 may apply (block 60) one or more heuristics to generate modified SMT formulas 62. That is, as discussed in greater detail below, in certain embodiments, after performing the initial analysis of the SMT formulas 54, the analytical engine pool 30 may modify the SMT formulas 54 using the initially generated test case data to generate modified SMT formulas 56. As such, the disclosed heuristics generally guide the analytical engine pool 30 in narrowing down the input and output variable value ranges returned by the SMT solvers 32 to specific values. The modified SMT formulas 62 may subsequently be provided, as input, to one or more SMT solvers 32 of the analytical engine pool 30, and additional test case data 58 may then be generated. It may be appreciated that these heuristics may be applied the value of one or more input variables and/or one or more output variables of the SMT formulas.

For example, in certain embodiments, the heuristics of block 60 may include fixing the value of one or more input variables or fixing the value of one or more output variables using an iterative analysis process. For example, to fix input (or output) variable values, after obtaining the initial test case data 58 from the SMT solver 32, the analytical engine pool 30 may heuristically select a particular value for each input (or output) variable of the SMT formulas 54 from the ranges of values in the initial test case data 58. For example, in certain embodiments, the analytical engine pool 30 may select, as the particular value for an input (or output) variable, the upper or lower bound determined by the SMT solver 32 for the variable, a random value between the upper bound and the lower bound, or an average of the upper and lower bound. By assigning these selected values to the input (or output) variables, the analytical engine pool 30 may generate the modified SMT formulas 62 that are subsequently provided again as input to the SMT solver 32. As such, in this iteration, the test case data 58 returned by the SMT solver 32 would include fixed values for the input variables of the SMT formulas 54. When fixing the value of input variables, the output variable values are still returned as ranges of values, and vice versa. However, when the precision is reasonably small, one can justifiably claim that, given the fixed values for the input (or output) variables, the output (or input) variables are expected in certain ranges with that level of precision.

Completing the process 50 illustrated in FIG. 2, the test case data 58 generated by the analytical engine pool 30 may be received, as input, by the post-processor 34. The post-processor 34 generally converts (block 64) the test case data 58 into test cases and/or test procedures 14 to be used during verification of the software. For example, as mentioned, a portion of the test case data 58 generally includes ranges of values for input and output variables of the analyzed SMT formulas 54, and these may be converted to particular values for input variables to be provided to, and particular values for output variables expected to be returned from, the software during testing. At times, for example, the upper and lower bounds of a variable value range may differ by less than the desired precision, and, therefore, these ranges may be truncated at the precision position to yield a particular value. Additionally, in certain embodiments, test cases and/or test procedures 14 generated by the post-processor 34 may include an executable script that is designed to perform the software verification. For example, in certain embodiments, the test cases and/or test procedures 14 may include a script that may be executed by the processing circuitry of a computing device to prompt the execution of the software to be verified while providing, as input, the determined input variable values. In certain embodiments, the script may further determine whether the values of one or more output variables returned by the execution of the software differ from the expected values of the one or more output variables in the test cases and/or test procedures 14 by more than the desired level of precision. In other embodiments, the test cases and/or test procedures 14 may include human-readable text that may instruct a human tester what input variable values to provide to the software, and what output variable values to expect from the execution of the software, such that the human tester can manually carry out the software verification from the test cases and/or test procedures 14.

Figure 3:
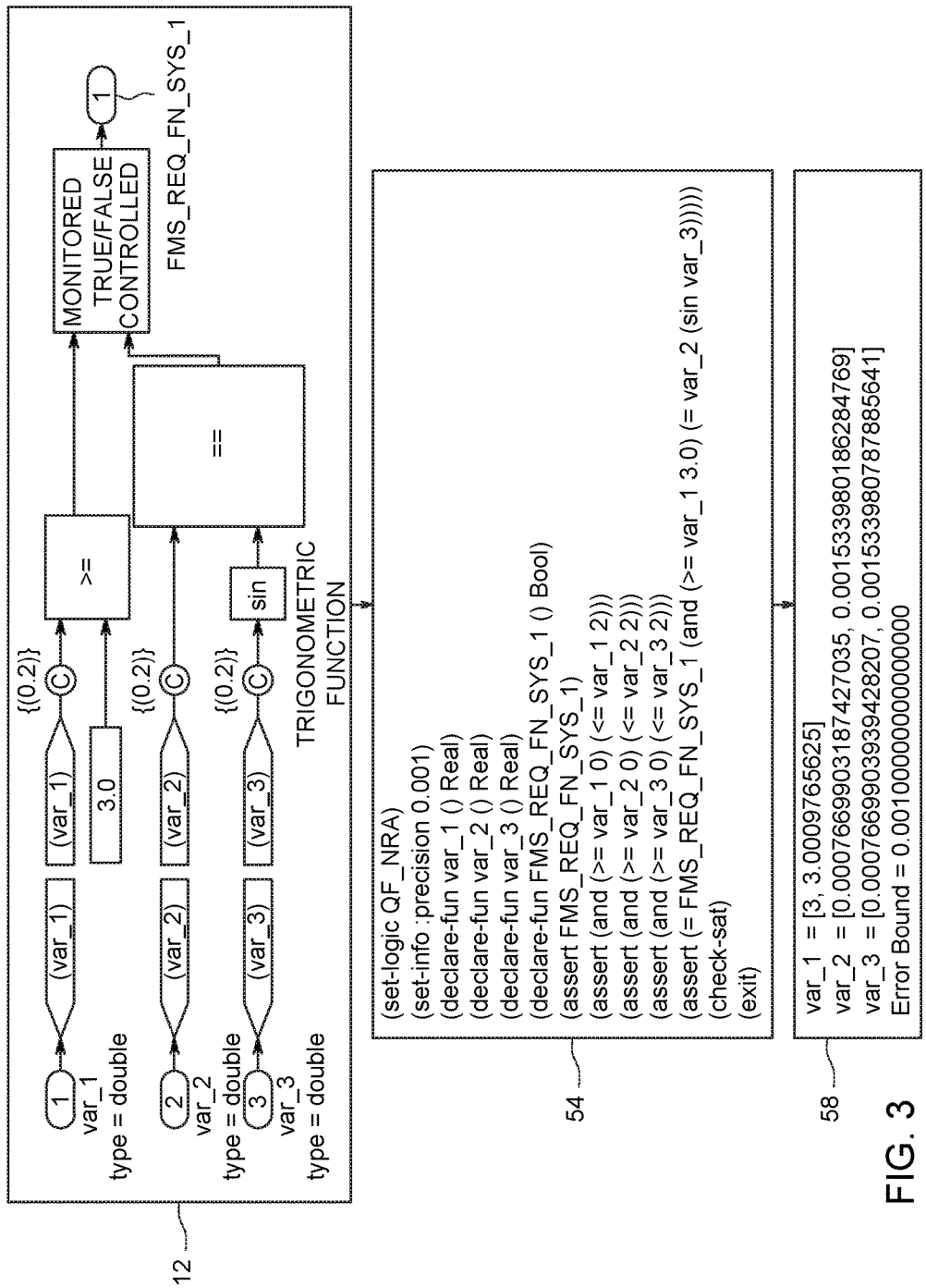

FIGS. 3 and 4 illustrate portions of an example of determining test cases and/or test procedures 14 for a particular software function. In particular, FIG. 3 illustrates a visual depiction of a software specification model 12 in Simulink. In textual form, the function specifies: when var_1 is greater or equal to 3.0, the value of var_2 shall be set to equal to sin(var_3), wherein var_1 and var_3 are input variables and var_2 is an output variable. Additionally, the desired precision for the example is 0.001. As presented in block 52 of FIG. 2, the software specification model 12 is received by the translator 28, and the translator 28 may parse the software specification models 12 to extract the layout and the block information, and then translate these into semantically equivalent SMT formulas 54. As such, the SMT formula 54 illustrated in FIG. 3 is semantically equivalent to the software specification model 12.

Once the SMT formula 54 illustrated in FIG. 3 has been provided as input to the analytical engine pool 30, a SMT solver 32 returns test case data 58. As mentioned above, each of the variables is included in the test case data 58 as a range of numbers (e.g., var_1 from 3 to 3.0009765625). Furthermore, the test case data 58 includes the error bound, which corresponds to the user's desired precision when verifying the function. In certain embodiments, the test case data 58 illustrated in FIG. 3 may subsequently be received by the post-processor 34 to generate the test cases and/or test procedures 14 from the test case data 58, as discussed above.

In other embodiments, as indicated by block 60 of FIG. 2, the analytical engine pool 30 may apply one or more heuristics to generate modified SMT formulas 62 using the test case data 58, such as the test case data 58 illustrated in FIG. 3. For example, FIG. 4 illustrates a modified SMT formula 62 that was generated by heuristically combining the SMT formula 54 and the test case data 58 illustrated in FIG. 3. As such, the modified SMT formula 62 of FIG. 4 includes additional statements (e.g., "(assert (=var_1 3.0009765625)" and "(assert (=var_3 0.0015339980787885641)))") that define particular values for input variables var_1 and var_3. Further, FIG. 4 also illustrates the additional test case data 58 generated by the SMT solver 32 of the analytical engine pool 30 after analyzing the modified SMT formula 62 of FIG. 4. While still presented in a range notation, the upper and lower bounds indicated for input variables var_1 and var_3 are now the same.

Finally, FIG. 4 also illustrates the test case 14 generated from the test case data 58 of FIG. 4. As discussed above with respect to block 64 of FIG. 2, the post-processor 34 receives the test case data 58 illustrated in FIG. 4, truncates the input and output variable values, and indicates the requested level of precision or error bound used in the analysis. As such, during verification of the software, the software may be executed while the indicated values of var_1 and var_3 are provided as inputs, and var_2 is expected to have a value that is within the level of precision (e.g., 0.001) of the indicated output value (e.g., 0.001). Additionally, as discussed above, in certain embodiments, the test case 14 may include one or more scripts that are generated from the test case data 58 by the post-processor 34.

Technical effects of the invention include the automated generation of test cases and/or test procedures for software that contains nonlinear arithmetic constraints over Real number ranges. Such constraints are common in various types of modeling software and/or control system software used to model and/or control various types systems (e.g., aviation systems, automotive systems, utility systems, turbine systems, etc.). The disclosed system is generally designed to receive one or more software specification models for a piece of software to be verified, to convert the one or more software specification models to semantically equivalent SMT formulas, to analyze the SMT formulas to generate test case data that indicates ranges of values for each input and output variable of the software, and to generate, from the test case data, one or more particular test cases and/or test procedures to be used in the verification of the software. Present embodiments enable the use of heuristics to guide the analysis of SMT formulas and to narrow the ranges of values returned during the SMT formula analysis down to particular values. Additionally, in certain embodiments, the test case data can be further modified during post-processing to provide the test cases and/or test procedures in a desired format and/or to provide additional functionality (e.g., executable scripts) during software testing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
    receiving, at processing circuitry of a software test generation system, software specification models of software including at least one nonlinear arithmetic constraint over a Real number range;
    generating, via the processing circuitry, satisfiable modulo theories (SMT) formulas that are semantically equivalent to the software specification models of the software including the at least one nonlinear arithmetic constraint over a Real number range;
    analyzing, via the processing circuitry, the SMT formulas using at least one SMT solver of an analytical engine pool to generate test case data for each of the SMT formulas; and
    post-processing, via the processing circuitry, the test case data to automatically generate one or more tests comprising inputs and expected outputs for testing the software including the at least one nonlinear arithmetic constraint over a Real number range;
    wherein the generating the SMT formulas comprises flattening one or more state-based operations in the software specification models into SMT formulas that are stateless and capable of being analyzed by the at least one SMT solver;
    wherein the post-processing comprises converting ranges of values indicated in the test case data into particular values for one or more input variables and one or more output variables of the software to be verified and the converting comprises truncating the ranges of values indicated in the test case data at a particular precision to yield the particular values.

2. The method of claim 1, wherein the generating the SMT formulas comprises parsing and translating the software specification models through a strongly-typed intermediate language to generate the SMT formulas.

3. The method of claim 2, wherein the intermediate language comprises Lisp or Lustre.

4. The method of claim 1, comprising:
    receiving, at the processing circuitry, test objectives for the software to be verified; and
    instrumenting, via the processing circuitry, the software specification models using the test objectives.

5. The method of claim 1, comprising:
    applying one or more heuristics to generate modified SMT formulas from the SMT formulas and the generated test case data; and
    analyzing, via the processing circuitry, the modified SMT formulas using the at least one SMT solver of the analytical engine pool to generate additional test case data for each of the modified SMT formulas that are satisfiable; and wherein post-processing comprises post-processing the additional test case data with the test case data to generate the one or more test cases for the software to be verified.

6. The method of claim 5, wherein the generating the modified SMT formulas comprises fixing an input variable of the SMT formulas to a value indicated by the generated test case data.

7. The method of claim 5, wherein the generating the modified SMT formulas comprises fixing an output variable of the SMT formulas to a value indicated by the generated test case data.

8. The method of claim 1, wherein the converting comprises selecting and truncating upper bounds or lower bounds of the ranges of values indicated in the test case data to yield the particular values.

9. The method of claim 1, wherein the post-processing comprises post-processing the test case data to generate a plurality tests for the software to be verified, wherein each test includes at least one input variable value for the software to be verified, at least one output variable value for the software to be verified, and a precision that the software is to achieve to successfully pass the test case and/or test procedure.

10. A computer-implemented system comprising:
    a translator configured to receive, as input, software specification models of software including at least one nonlinear arithmetic constraint over a Real number range, wherein the translator is configured to generate, as output, a plurality of satisfiable modulo theories (SMT) formulas that are semantically equivalent to the software specification models of the software including the at least one nonlinear arithmetic constraint over a Real number range;
    an analytical engine pool configured to receive, as input, the plurality of SMT formulas from the translator and to analyze the plurality of SMT formulas to generate, as output, test case data for each of the plurality of SMT formulas; and
    a post-processor configured to receive, as input, the test case data from the analytical engine pool and to automatically generate, as output, one or more tests comprising inputs and expected outputs for testing the software including the at least one nonlinear arithmetic constraint over a Real number range;
    wherein the translator generates the plurality of SMT formulas by flattening one or more state-based operations in the software specification models into the plurality of SMT formulas that are stateless and capable of being analyzed by at least one SMT solver;
    wherein the post-processor converts ranges of values indicated in the test case data into particular values for one or more input variables and one or more output variables of the software to be verified and the converting comprises truncating the ranges of values indicated in the test case data at a particular precision to yield the particular values.

11. The system of claim 10, wherein the software specification models comprise a formal modeling language or a structured modeling language.

12. The system of claim 10, wherein the formal modeling language comprises Simulink.

13. The system of claim 10, wherein the software specification models comprise software specification models for control system software or modeling software.

14. The system of claim 13, wherein the control system software or modeling software comprise software for controlling and/or modeling the operation of an aviation system, an automotive system, or a turbine system.

15. The system of claim 10, wherein the test case data comprises:

a respective range of each input variable of the software to be verified;

a respective range of each output variable of the software being verified; and an error bound.

16. The system of claim 15, wherein one or more tests comprise:

a respective value for each input variable of the software being verified that is within the respective range of the input variable from the test case data;

a respective value for each output variable of the software being verified that is within the respective range of the output variable from the test case data; and a precision value, wherein the precision is the same as the error bound of the test case data.

17. The system of claim 16, wherein the one or more tests further comprise a script configured to:

instruct a processor to execute the software to be verified using the respective value of each input variable from the test case;

determine a respective value for each output variable of the executed software; and provide an output indicating whether the respective values for each output variable of the executed software and the respective value for each output variable of the test case differ by more than the precision value.

18. The system of claim 10, wherein the analytical engine pool is configured to select the at least one SMT solver from a plurality of SMT solvers of the analytical engine pool to receive and analyze each SMT formula of the plurality of SMT formulas based on one or more constraints of the SMT formula.

19. The system of claim 10, wherein at least one of the translator, the analytical engine pool, and the post-processor is executed using processing circuitry.

20. A non-transitory computer-readable medium storing instructions executable by processing circuitry of an electronic device, the instructions comprising:

instructions to receive a software specification model of software including at least one nonlinear arithmetic constraint over a Real number range;

instructions to generate at least one satisfiable modulo theories (SMT) formula that is semantically equivalent to the software specification model of the software including the at least one nonlinear arithmetic constraint over a Real number range;

instructions to analyze the at least one SMT formula using a SMT solver and to generate test case data for the at least one SMT formula; and instructions to generate, from the test case data, one or more tests comprising inputs and expected outputs for testing the software including the at least one nonlinear arithmetic constraint over a Real number range;

instructions to convert ranges of values indicated in the test case data into particular values for one or more input variables and one or more output variables of the software to be verified, wherein the converting comprises truncating the ranges of values indicated in the test case data at a particular precision to yield the particular values.

* * * * *